United States Patent [19]

Inoue et al.

[11] Patent Number: 4,822,707

[45] Date of Patent: Apr. 18, 1989

[54] POSITIVELY CHARGEABLE TONERS FOR USE IN DRY TYPE ELECTROPHOTOGRAPHY COMPRISING A BLUE DYE LAKE CHARGE CONTROL AGENT

[75] Inventors: Satoru Inoue, Mishima; Akio Matsui, Numazu, both of Japan

[73] Assignee: Ricoh Co., Ltd., Tokyo, Japan

[21] Appl. No.: 756,521

[22] Filed: Jul. 18, 1985

[30] Foreign Application Priority Data

Jul. 30, 1984 [JP] Japan ................................ 59-157251

[51] Int. Cl.$^4$ .............................................. G03G 9/08
[52] U.S. Cl. ..................................... 430/106; 430/109; 430/110
[58] Field of Search ..................... 430/109, 110, 106

[56] References Cited

U.S. PATENT DOCUMENTS

| | | | |
|---|---|---|---|
| Re. 27,912 | 2/1974 | Miller | 430/106.6 |
| 3,165,420 | 1/1965 | Tomanek | 430/110 X |
| 3,949,116 | 4/1976 | Lawson | 430/112 X |
| 3,990,980 | 11/1976 | Kosel | 430/114 X |
| 4,005,022 | 1/1977 | Vijayendran | 430/115 |
| 4,021,358 | 3/1977 | Tomono et al. | 430/109 |

OTHER PUBLICATIONS

Color Index, Soc. of Dyers & Colorists, 1971, pp. 4412–4413.

Primary Examiner—J. David Welsh
Attorney, Agent, or Firm—Flynn, Thiel, Boutell & Tanis

[57] ABSTRACT

The present invention provides a positively chargeable for use in dry type electrophotography that contains, as a charge controlling agent, a lake (blue pigment) of a compound represented by the general formula:

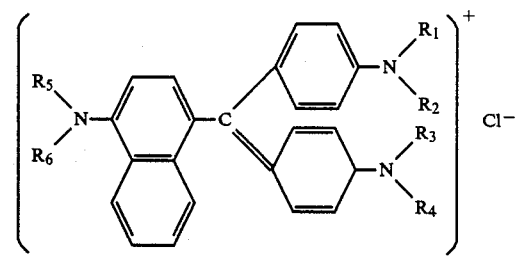

[Wherein, $R_1$, $R_2$, $R_3$, $R_4$, $R_5$ and $R_6$ are H, $C_nH_{2n+1}$ (n is an integer of 1–5) or

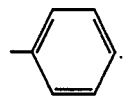

These $R_1$–$R_6$ may be the same or different].

12 Claims, No Drawings

POSITIVELY CHARGEABLE TONERS FOR USE IN DRY TYPE ELECTROPHOTOGRAPHY COMPRISING A BLUE DYE LAKE CHARGE CONTROL AGENT

BACKGROUND OF THE INVENTION (a) Field of the Invention

The present invention relates to a toner for use in developing an electrostatic latent image in electrophotography, electrostatic recording, electrostatic printing and the like, in particular relates to a toner for use in dry type electrophotography that has been incorporated with a specific lake pigment effective for controlling said toner to be at positive polarity.

(b) Description of the Prior Art

The toners for use in the dry type developer used for developing electrostatic latent images in electrophotography, electrostatic recording, electrostatic printing and the like are generally comprised of binder resins such as styrene resin, phenol resin and the like; charge controlling agents; and coloring agents such as carbon black, Nigrosine and the like in case of necessity. As the charge controlling agents there are used, for instance, metal-containing dyes in the case of charging the toners negatively, whilst there are used (1) Nigrosine dyes, (2) certain kinds of basic dyes (Japanese Laid Open Patent Application No. 11455/1976), (3) certain kinds of lakes of xanthene dyes (Japanese published patent application No. 9906/1984) and the like in the case of charging the toners positively.

However, the latter controlling agents are defective in the efficiency of charging the toners positively, that is the controlling agent shown in the preceding (1) is defective in the marked unbalance in charging characteristics between manufacturing batches, the marked changes in course of time, and the like; the controlling agent shown in the preceding (2) is defective in that it is not fully dispersed in the binder resin used in the toner and further charging is unstable against changes in temperature and humidity; and the controlling agent shown in the preceding (3) is more stable against changes in temperature and humidity than that shown in the preceding (2) but is unstable in charging because it is not fully dispersed in the binder resin used in the toner. In the light of the aforegoing, further improvement has been called for.

SUMMARY OF THE INVENTION

The object of the present invention is to provide a positively chargeable toner for use in dry type electrophotography that is capable of eliminating the above mentioned problems inherent in the prior art, and obtaining stable images continuously due to its stable charging characteristic.

The positively chargeable toner for use in dry type electrophotography according to the present invention is consisted essentially of a binder resin and a charge controlling agent, wherein said charge controlling agent is a lake of a compound represented by the following general formula:

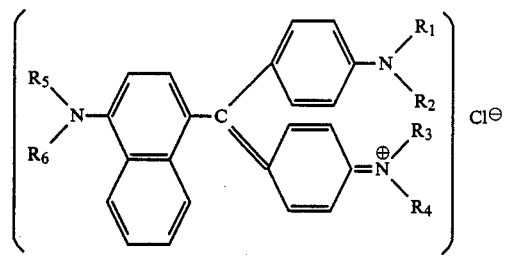

[wherein, $R_1$, $R_2$, $R_3$, $R_4$, $R_5$ and $R_6$ are H, $C_nH_{2n+1}$ (n is an integer of 1-5) or

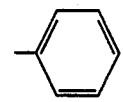

These $R_1$-$R_6$ may be the same or different].

We have carried out various studies and investigations for the purpose of achieving aforesaid object to confirm that when using a lake of the compound represented by said general formula, there can be obtained a uniform, clear-cut image, and further there can be obtained a stably charged positive polar toner. The present invention has been completed on the basis of this finding.

In the present invention, the compound represented by the above mentioned general formula is a blue dye. As its suitable examples there can be enumerated the following:

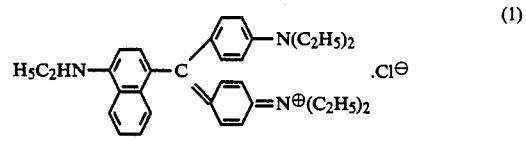

(1)

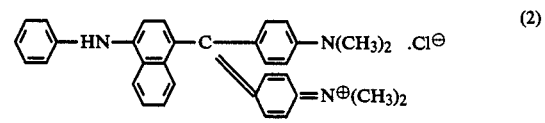

(2)

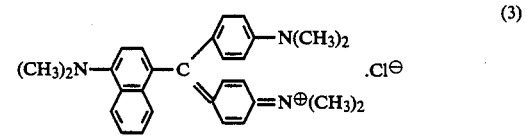

(3)

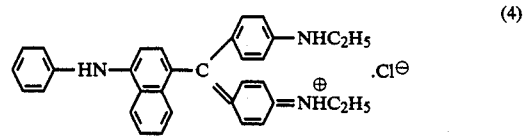

(4)

The method of forming a lake from the compound represented by the above mentioned general formula is not especially limited. The usual method is applicable thereto. For instance, an aqueous solution of a metallic salt of phosphotungstenmolybdic acid, phosphotungstic acid, phosphomolybdic acid or the like is added in an aqueous acetic acid solution containing the compound represented by said general formula, and the resulting lake is precipitated.

The toner according to the present invention comprises adding a resin for use in the toner, or a resin for use in the toner and a coloring agent, besides such the lake. As the resin for use in the toner, there can be enumerated styrene resin, epoxy resin, phenol resin, maleic resin, polyamide resin and the like. Among them, the styrene resin is suitably used.

The styrene resin includes a homopolymer of styrene, a styrene copolymer resulting from copolymerization of a monomer copolymerizable with styrene with styrene monomer, a styrene terpolymer and the like.

As the monomer copolymerizable with styrene, there can be enumerated methacrylic ester such as methyl methacrylate, ethyl methacrylate, n-butyl methacrylate and the like; acrylic ester such as methyl acrylate, ethylacrylate, butylacrylate, 2-ethyl hexyl acrylate and the like; styrene derivatives such as chlorostyrene, α-methylstyrene and the like; and the other vinyl monomers such as vinyl chloride, vinyl acetate and the like As can be seen from the above explanation, the lake according to the present invention is a blue pigment. Accordingly, it can provide a positively chargeable cyan toner for use in color electrophotography in cooperation with the resin for use in the toner. The amount of the lake contained in this toner is 0.1-15 parts by weight, preferably 0.5-7 parts by weight, per 100 parts by weight of the resin.

On the other hand, when a normal toner is prepared by using the lake of the present invention as the charge controlling agent and dispersing it together with another coloring agent in the resin, the amount of the lake is 0.1-5 parts by weight, preferably 0.5-3 parts by weight, per 100 parts by weight of the resin.

As the coloring agent, there can be enumerated carbon black, Nigrosine dye, Benzidine Yellow pigment, phthalocyanine pigment, rhodamine pigment, carmine pigment, quinacridone pigment, ultramarine prussian blue and the like. The amount of the coloring agent in this case is preferably in the range of 1-20 parts by weight per 100 parts by weight of the resin.

The thus obtained toner is, as usual, admixed with a carrier such as iron powder, glass beads or the like, and used as a dry type developer, which displays a strong positive chargeability against the carrier.

According to the present invention, the above mentioned specific lake is used in the resin, whereby the lake is well dispersed in the resin, a superior charging characteristic is displayed and the charging characteristic scarcely changes with the lapse of time. Therefore, the present invention can obtain stable images even when copying is carried out continuously.

DESCRIPTION OF THE PRFERRED EMBODIMENTS

Next, Examples and Comparative Example will be given below.

EXAMPLE 1

| | |
|---|---|
| styrene-normal butyl methacrylate copolymer (Mw = 50,000) | 100 parts by weight |
| phosphotungstenmolybdic acid lake of compound (1) | 5 parts by weight |

A composition comprising the above mentioned components was melted and mingled in a roll mill. Same was cooled, thereafter pulverized by a jet mill and classified to obtain a 5-20 μ-blue toner powder. 95 parts by weight of a carrier iron powder (TEFV200/300 produced by NIHON TETSUFUN K.K.) was mingled with 5 parts by weight of this powder to thereby prepare a positively chargeable dry type developer. The specific charged amount of the toner in this developer was measured by the blowoff method to be +20 μc/g. Thus, a superior chargeability was confirmed.

In succession, this developer was set in FT7500 (Dry type electrophotographic copying machine produced by RICOH) for copying, thereby obtaining a fog-free, clear-cut image. The specific charged amount of the toner after continuous copying of 10,000 sheets was measured to be +20 μc/g. Thus, a stable charging characteristic was confirmed. Further, 40,000 sheets were copied continuously, but any deterioration in copy quality was not observed. The specific charge amount on the toner at this time was 18 μc/g.

EXAMPLE 2

| | |
|---|---|
| styrene-normal butyl methacrylate copolymer (Mw = 50,000) | 100 parts by weight |
| phosphotungstenmolybdic acid lake of Compound (2) | 5 parts by weight |

A composition comprising the above mentioned components was melted and mingled in a roll mill. Same was cooled, thereafter pulverized by a jet mill, and classified to obtain a 5-20 μ-blue toner powder. 95 parts by weight of a carrier iron powder (TEFV200/300 produced by NIHON TETSUFUN K.K.) was mingled with 5 parts by weight of this toner powder to thereby prepare a positively chargeable dry type developer. The specific charged amount of the toner in this developer was measured by the blowoff method to be +18 μc/g. Thus, a superior chargeability was confirmed.

In succession, this developer was set in FT7500 for copying to thereby obtain a fog-free, clear-cut image. Further, 10,000 sheets were copied continuously, but any deterioration in copy quality was not observed. The specific charged amount of the toner at this time was +17 μc/g.

EXAMPLE 3

| | |
|---|---|
| styrene-butyl acrylate copolymer (Mw = 100,000) | 100 parts by weight |
| phosphotungstenmolybdic acid lake of compound (1) | 3 parts by weight |
| carbon black (MA-100 produced by Mitsubishi Kasei) | 5 parts by weight |

A composition comprising the above mentioned components was melted and mingled in a roll mill. Same was cooled, thereafter pulverized by a jet mill, and classified to obtain a 5-20 μ-black toner powder. 95 parts by weight of a carrier iron powder (TEFV200/300 produced by NIHON TETSUFUN K.K.) was mingled with 5 parts by weight of this toner powder to thereby prepare a positively chargeable dry type developer. The specific charged amount of the toner in this developer was measured by the blowoff method to be +15 μc/g. A superior chargeability was confirmed from this.

In succession, this developer was set in FT7500 for copying to obtain a fog-free, clear-cut image. Further, 20,000 sheets were copied continuously, but any deterioration in copy quality was not observed. The specific charged amount of the toner at this time was +13 μc/g.

EXAMPLE 4

| polystyrene ($\overline{Mw}$ = 10,000) | 100 parts by weight |
|---|---|
| phosphotungstenmolybdic acid lake of Compound (2) | 3 parts by weight |

A composition comprising the above mentioned components was melted and mingled in a roll mill. Same was cooled and thereafter pulverized by a jet mill, and classified to prepare a 5-20 μ-blue toner powder. 98 weight parts of a polymethyl methacrylate-coated steel shot carrier was mingled with 2 parts by weight of this toner powder to prepare a positively chargeable dry type developer. The specific charged amount of the toner in this developer was measured by the blowoff method to be +14 μc/g. A more superior chargeability was confirmed from this. Further, 10,000 sheets were copied continuously, but any deterioration in copy quality was not observed. The specific charged amount of the toner at this time was +15 μc/g.

COMPARATIVE EXAMPLE 1

| styrene-normal butyl methacrylate copolymer ($\overline{Mw}$ = 50,000) | 100 parts by weight |
|---|---|
| compound (1) | 5 parts by weight |

A toner composition comprising the above components was melted and mingled in a roll mill. Same was cooled and thereafter pulverized by a jet mill, and classified to obtain a 5-20 μ-blue toner powder. 95 parts by weight of the carrier (TEFV200/300 produced by NIHON TETSUFUN K.K.) was mingled with 5 parts by weight of this toner powder to prepare a positively chargeable dry type developer. The specific charged amount of the toner in this developer was measured by the blowoff method to be +10 μc/g. Further, continuous copying was carried out to find that an about 2,000 the sheet was deteriorated in copy quality. The specific charged amount at this time was +9 μc/g.

What is claimed is:

1. A toner for use in a dry developer for electrophotography, which toner is triboelectrically charged with a positive electric charge, consisting essentially of a binder resin and a charge controlling agent, wherein said binder resin consists essentially of styrene resin or epoxy resin and said charge controlling agent is a lake which is a phosphotungstenmolybdic acid salt, phosphotungstic acid salt or phosphomolybdic acid salt of a compound having the formula $$\left[ R_5\diagdown_{R_6}N-\bigcirc\!\!\!\!\bigcirc-C\diagup\diagdown_{=N^{\oplus}\diagdown_{R_4}^{R_3}}^{\diagup\!\!\bigcirc-N\diagdown_{R_2}^{R_1}} \right] Cl^{\ominus}$$

wherein $R_1$, $R_2$, $R_3$, $R_4$, $R_5$ and $R_6$, which are the same or different, are H, $C_nH_{2n+1}$ wherein n is an integer of 1 to 5, or a phenyl group.

2. A toner according to claim 1, wherein the amount of said lake is in the range of 0.1-15 parts by weight per 100 parts by weight of said resin.
3. A toner according to claim 1 in which said binder resin consists essentially of a homopolymer of styrene.
4. A toner according to claim 1 in which said binder resin consists essentially of a copolymer of styrene and a monomer copolymerizable with styrene and selected from the group consisting of alkyl methacrylates, alkyl acrylates, chlorostyrene, α-methylstyrene, vinyl chloride and vinyl acetate.
5. A toner according to claim 1 in which said binder resin consists essentially of a copolymer of styrene and n-butyl methacrylate.
6. A dry developer composition for electrophotography which consists essentially of a toner according to claim 1 mixed with carrier particles.
7. A toner for use in a dry developer for electrophotography, which toner is triboelectrically charged with a positive electric charge, consisting essentially of a coloring agent, a binder resin and a charge controlling agent, wherein said binder resin consists essentially of a styrene resin or epoxy resin and said charge controlling agent is a lake which is a phosphotungstenmolybdic acid salt, phosphotungstic acid salt or phosphomolybdic acid salt of a compound having the formula $$\left[ R_5\diagdown_{R_6}N-\bigcirc\!\!\!\!\bigcirc-C\diagup\diagdown_{=N^{\oplus}\diagdown_{R_4}^{R_3}}^{\diagup\!\!\bigcirc-N\diagdown_{R_2}^{R_1}} \right] Cl^{\ominus}$$

wherein $R_1$, $R_2$, $R_3$, $R_4$, $R_5$ and $R_6$, which are the same or different, are H, $C_nH_{2n+1}$ wherein n is an integer of 1 to 5, or a phenyl group.

8. A toner according to claim 7, wherein the amount of the lake and the amount of the coloring agent are in the range of 0.1-5 parts by weight and in the range of 1-20 parts by weight respectively per 100 parts by weight of the resin.
9. A toner according to claim 7 in which said binder resin consists essentially of a homopolymer of styrene.
10. A toner according to claim 7 in which said binder resin consists essentially of a copolymer of styrene and a monomer copolymerizable with styrene and selected from the group consisting of alkyl methacrylates, alkyl acrylates, chlorostyrene, α-methylstyrene, vinyl chloride and vinyl acetate.
11. A toner according to claim 7 in which said binder resin consists essentially of a copolymer of styrene and n-butyl methacrylate.
12. A dry developer composition for electrophotography which consists essentially of a toner according to claim 7 mixed with carrier particles.

* * * * *